(12) United States Patent
Nair et al.

(10) Patent No.: US 12,159,052 B2
(45) Date of Patent: Dec. 3, 2024

(54) METHOD AND SYSTEM FOR PERFORMING REPLICATION RECOVERY OPERATION IN A DISAGGREGATED DISTRIBUTED STORAGE SYSTEMS

(71) Applicant: SAMSUNG ELECTRONICS CO., LTD., Suwon-si (KR)

(72) Inventors: Roshan R Nair, Bengaluru (IN); Arun George, Bengaluru (IN); Dinesh Ratra, Bengaluru (IN); Parag Jain, Bengaluru (IN); Preetham Parshwanath Jain, Bengaluru (IN); Rohit Kailash Sharma, Bengaluru (IN); Shivam, Bengaluru (IN); Vishak Guddekoppa, Bengaluru (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 43 days.

(21) Appl. No.: 18/090,023

(22) Filed: Dec. 28, 2022

(65) Prior Publication Data
US 2023/0205634 A1    Jun. 29, 2023

(51) Int. Cl.
| | |
|---|---|
| *G06F 11/00* | (2006.01) |
| *G06F 3/06* | (2006.01) |
| *G06F 11/10* | (2006.01) |
| *G06F 11/14* | (2006.01) |

(52) U.S. Cl.
CPC .......... *G06F 3/065* (2013.01); *G06F 3/0604* (2013.01); *G06F 3/067* (2013.01); *G06F 11/1092* (2013.01); *G06F 11/1451* (2013.01); *G06F 11/1464* (2013.01)

(58) Field of Classification Search
CPC ............ G06F 11/1092; G06F 11/1451; G06F 11/1464
USPC ....................................................... 714/1–57
See application file for complete search history.

(56) References Cited

U.S. PATENT DOCUMENTS

| | | | | |
|---|---|---|---|---|
| 7,568,124 | B2* | 7/2009 | Ali ....... | G06F 11/1458 |
| | | | | 713/193 |
| 2008/0126845 | A1* | 5/2008 | Luo ...... | G06F 11/2025 |
| | | | | 714/E11.007 |
| 2010/0017629 | A1* | 1/2010 | Murakami ........ | G06F 1/30 |
| | | | | 714/48 |
| 2011/0078494 | A1* | 3/2011 | Maki ..... | G06F 11/2028 |
| | | | | 711/E12.001 |
| 2012/0303999 | A1* | 11/2012 | Calder ... | G06F 11/1471 |
| | | | | 714/E11.09 |

(Continued)

*Primary Examiner* — Sarai E Butler
(74) *Attorney, Agent, or Firm* — Sughrue Mion, PLLC (57) ABSTRACT

A method of performing replication recovery operation in a disaggregated distributed storage system (DDSS) includes identifying an affected storage node included in the storage pool based on an occurrence of one or more predetermined conditions; selecting at least one replacement storage node from among one or more storage nodes included in the storage pool to recover replication data stored in the affected storage node; selecting at least one controller for performing a replication recovery operation from among one or more controllers included in the controller pool; and assigning one or more replication recovery jobs to the at least one controller; and receiving, by the replication recovery device, a notification from the at least one controller based on the one or more replication recovery jobs being completed.

21 Claims, 4 Drawing Sheets

(56) References Cited

U.S. PATENT DOCUMENTS

| | | | |
|---|---|---|---|
| 2013/0080828 A1* | 3/2013 | Sheffield | G06F 11/1092 |
| | | | 714/E11.062 |
| 2013/0205005 A1* | 8/2013 | Ashok | G06F 3/0658 |
| | | | 709/224 |
| 2015/0301901 A1* | 10/2015 | Rath | G06F 16/27 |
| | | | 707/634 |
| 2015/0370656 A1* | 12/2015 | Tsafrir | G06F 11/2094 |
| | | | 714/6.3 |
| 2015/0378856 A1* | 12/2015 | Yamakawa | G06F 3/061 |
| | | | 714/6.3 |
| 2016/0203066 A1* | 7/2016 | Cypher | G06F 11/2094 |
| | | | 714/6.21 |
| 2016/0357642 A1* | 12/2016 | Burshan | G06F 11/2066 |
| 2019/0370118 A1* | 12/2019 | Salapura | G06F 11/0709 |
| 2021/0072895 A1* | 3/2021 | Cheru | G06F 3/065 |
| 2022/0066928 A1* | 3/2022 | Tavallaei | G06F 12/123 |

* cited by examiner

FIG. 4

METHOD AND SYSTEM FOR PERFORMING REPLICATION RECOVERY OPERATION IN A DISAGGREGATED DISTRIBUTED STORAGE SYSTEMS

CROSS-REFERENCE TO RELATED APPLICATIONS

This application claims the benefit of Indian Patent Application No. 202141061082 (PS), filed on Dec. 28, 2021, and Indian Patent Application No. 202141061082 (CS), filed on Dec. 23, 2022 in the Indian Patent Office, the disclosures of which are incorporated by reference herein in their entirety.

BACKGROUND

1. Field

The disclosure relates to Disaggregated Distributed Storage System (DDSS), and more particularly to a method and system for performing replication recovery operation in a DDSS.

2. Description of Related Art

Replication is a redundancy technique which may be used in distributed storage systems. Replication relates to storing the same data on different storage nodes of the distributed storage systems, and may be based on a Replication Factor (RF). For example, based on a value of the RF being three, three copies of the same data may be generated. Replication may help against total data loss due to sudden failure of a storage node in distributed storage systems. However, when replication is enabled, a client may have only 1/RF of the total storage space available for consumption.

Trends such as disaggregation, Non-Volatile Memory Express Over Fabrics (NVMeOF) and adoption of flash are driving factors of new architectures in distributed storage. These trends present many additional challenges with respect to the replication recovery process, for example replica placement, effective utilization of replica copies, NAND awareness/Flash awareness, effective utilization of cluster resources, choice of controller and storage resources having different capabilities, recovery time on failures, degraded client performance, network traffic management, for example latency between a controller and a storage pool, and distribution of a load from controllers to the storage pool, and the like. These challenges may limit existing techniques from utilizing capabilities of rest of the controller and storage resources of, for example, a DDSS, which in turn may slow down the overall replication recovery operation. Some other existing techniques may use the controller and storage resources randomly, without performing any dynamic analysis of load on the resources, priority tasks performed by the resources, capabilities of the resources, NAND awareness about the resources, and the like, which in turn may exacerbate the above-mentioned challenges in replication recovery. In replication recovery, it may be desirable to recover data in the shortest time possible when the storage nodes fail, because increase in recovery time may lead to cascaded failure. Additionally, the existing techniques may not consider heterogeneity of the controllers while selecting the controllers to perform replication recovery, leading to under-utilization of potential controller capabilities.

One existing technique includes generating a recovery plan that includes a recovery order for performing the replication recovery operation. Based on the recovery plan, the data is copied into a new storage node. However, generating a recovery order only addresses the problem of which recovery operation should be performed first, and does not address any of the challenges associated with the replication recovery as discussed above.

SUMMARY

In accordance with an aspect of the disclosure, a method of performing replication recovery operation in a disaggregated distributed storage system (DDSS) includes identifying, by a replication recovery device associated with a controller pool and a storage pool of the DDSS, an affected storage node included in the storage pool based on an occurrence of one or more predetermined conditions: selecting, by the replication recovery device, at least one replacement storage node from among one or more storage nodes included in the storage pool to recover replication data stored in the affected storage node, based on one or more replacement storage parameters corresponding to each of one or more storage nodes included in the storage pool: selecting, by the replication recovery device, at least one controller for performing a replication recovery operation from among one or more controllers included in the controller pool, wherein each controller of the one or more controllers is associated with each storage node of the one or more storage nodes, based on at least one of a time required for recovery by the at least one controller and a bandwidth degradation caused by usage of the at least one controller for the replication recovery operation: assigning, by the replication recovery device, one or more replication recovery jobs to the at least one controller to perform the replication recovery operation on the at least one replacement storage node; and receiving, by the replication recovery device, a notification from the at least one controller based on the one or more replication recovery jobs being completed.

In accordance with an aspect of the disclosure, a replication recovery device for performing replication recovery operation in a disaggregated distributed storage system (DDSS) includes a memory configured to store instructions; and a processor configured to execute the instructions to: identify an affected storage node in a storage pool of the DDSS based on an occurrence of one or more predetermined conditions, select at least one replacement storage node from the storage pool to recover replication data stored in the affected storage node, based on one or more replacement storage parameters corresponding to each of one or more storage nodes included in the storage pool, select at least one controller to perform a replication recovery operation from among one or more controllers included in a controller pool of the DDSS, based on at least one of a time required for recovery by the at least one controller, and bandwidth degradation due to usage of the at least one controller to perform the replication recovery operation, and assign one or more replication recovery jobs to the at least one controller to perform the replication recovery operation on the at least one replacement storage node, and receive a notification from the at least one controller based on the one or more replication recovery jobs being completed.

In accordance with an aspect of the disclosure, a disaggregated distributed storage system (DDSS) includes a plurality of storage nodes: a plurality of memory controllers, wherein each memory controller of the plurality of memory controllers is associated with each storage node of the plurality of storage nodes; and a replication recovery device configured to: identify an affected storage node from among the plurality of storage nodes based on one or more predetermined conditions, select a replacement storage node from among the plurality of storage nodes based on one or more replacement storage parameters corresponding to the each storage node, select at least one memory controller to perform a replication recovery operation from among the plurality of memory controllers based on at least one of a time required by the at least one controller to perform the replication recovery operation, and a bandwidth degradation associated with using the at least one controller to perform the replication recovery operation, wherein the replication recovery operation is used to recover replication data stored in the affected storage node from the replacement storage node; and assign one or more replication recovery jobs to the at least one controller, wherein the one or more replication recovery jobs are included in the replication recovery operation, and receive a notification from the at least one controller based on the one or more replication recovery jobs being completed.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF DRAWINGS

The above and other aspects, features, and advantages of certain embodiments of the present disclosure will be more apparent from the following detailed description taken in conjunction with the accompanying drawings, in which.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether such computer or processor is explicitly shown.

DETAILED DESCRIPTION

Hereinafter, example embodiments will be described with reference to the accompanying drawings.

As is traditional in the field, the example embodiments may be described and illustrated in terms of blocks which carry out a described function or functions. These blocks, which may be referred to herein as units, modules, circuits, blocks, controllers, nodes, or the like, are physically implemented by analog or digital circuits such as logic gates, integrated circuits, microprocessors, microcontrollers, memory circuits, passive electronic components, active electronic components, optical components, hardwired circuits, or the like, and in embodiments may be driven by firmware. The circuits may, for example, be embodied in one or more semiconductor chips, or on substrate supports such as printed circuit boards and the like. The circuits included in a block may be implemented by dedicated hardware, or by a processor (e.g., one or more programmed microprocessors and associated circuitry), or by a combination of dedicated hardware to perform some functions of the block and a processor to perform other functions of the block. Each block of embodiments may be physically separated into two or more interacting and discrete blocks without departing from the scope of the disclosure. Likewise, the blocks of embodiments may be physically combined into more complex blocks without departing from the scope of the disclosure.

As used herein, expressions such as "at least one of" when preceding a list of elements, modify the entire list of elements and do not modify the individual elements of the list. For example, the expression, "at least one of a, b, and c" should be understood as including only a, only b, only c, both a and b, both a and c, both b and c, or all of a, b, and c.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

Particular embodiments are illustrated by way of example in the drawings and will be described in detail below. It should be understood, however that the description of these particular embodiments is not intended to limit the disclosure to the specific forms disclosed, but on the contrary, the disclosure is intended to cover all modifications, equivalents, and alternatives falling within the scope of the disclosure.

The terms "comprises", "comprising", "includes", or any other variations thereof, are intended to cover a non-exclusive inclusion, such that a setup, device, or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

In general, the same reference numerals are used throughout the description and the figures to reference the same, or substantially similar, features and components.

Embodiments relate to a method of performing replication recovery operation in a Disaggregated Distributed Storage System (DDSS). Embodiments may identify an affected storage node in the storage pool based on occurrence of one or more predefined conditions. Further, embodiments may select at least one replacement storage node from the storage pool to recover replication data stored in the affected storage node, based on one or more replacement storage parameters of each of the one or more storage nodes. Further, at least one controller may be selected for performing a replication recovery operation from the controller pool based on at least one of time required for recovery by the at least one controller and bandwidth degradation due to usage of the at least one controller for the replication recovery operation. Further, embodiments may assign one or more replication recovery jobs to the at least one controller to perform the replication recovery operation on the at least one replacement storage node. The replication recovery system may receive notification from the at least one controller upon completion of the one or more replication recovery jobs.

Embodiments may perform flash aware selection (for example based on NAND awareness, wear level, and Program/Erase (P/E) cycle) while selecting the replacement storage node. This may help to ensure the endurance of the storage pool and reduce degradation of the NAND devices. Further, embodiments may be resource aware. For example, the replication recovery system may be aware of the capabilities of the one or more storage nodes in the storage pool, and the one or more controllers in the controller pool. This may provide the ability to select the replacement storage node and controller to perform replication recovery operations effectively, which may in turn help to minimize the time used for recovery and allow faster recovery to be performed without affecting the client performance. Further, embodiments may provide the ability to select any number of controllers and storage nodes for performing the replication recovery operation, without limiting the controller and storage resources. This may help in enhancing flexibility in the replication recovery process that in turn helps in preventing longer recovery time and also in preventing bandwidth degradation for the regular client input/output (I/O) operations. Embodiments may further provide the ability to disable the source storage node from which a healthy replica copy is accessed, and also disable a controller or combination of controllers used for the replication recovery process, from performing the regular I/O operations such that complete ability of the source storage node and the controller or combination of controllers may be used for only the replication recovery operation. This may also in turn help in minimizing the effect of bandwidth degradation for the client.

In the following detailed description, reference is made to the accompanying drawings, in which are shown specific embodiments, by way of illustration. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Figure 1:
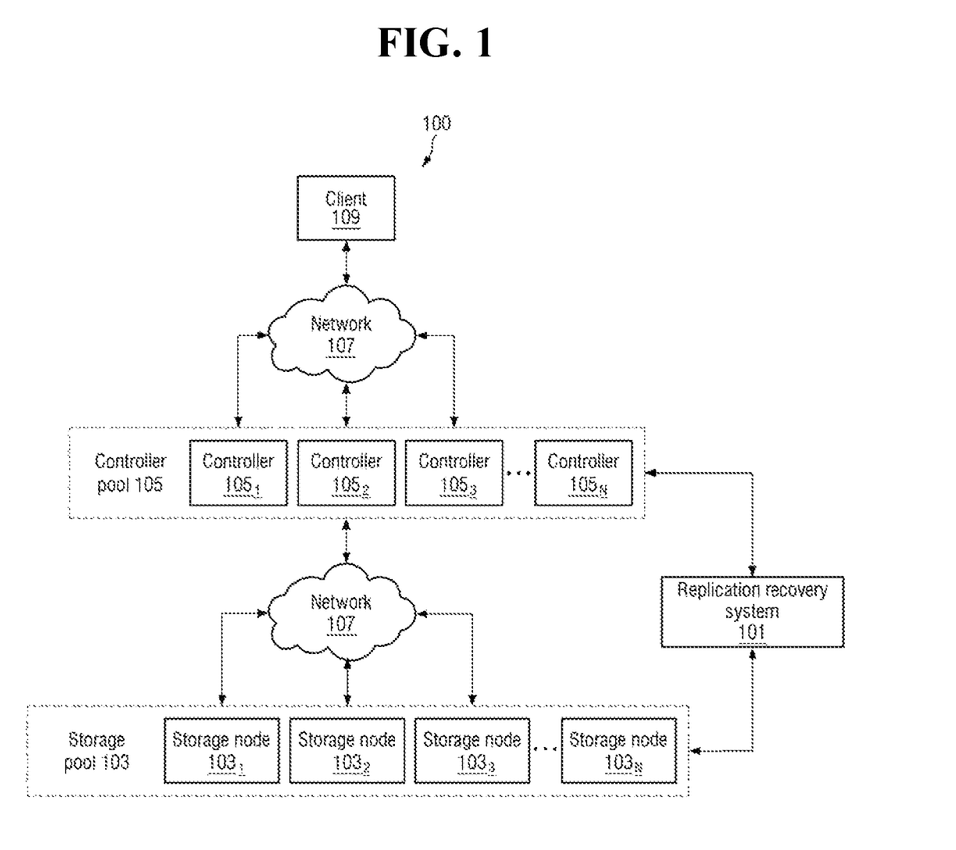
FIG. 1 shows an architecture of a disaggregated distributed storage system (DDSS), in accordance with some embodiments of the present disclosure.

FIG. 1 shows an architecture of a Disaggregated Distributed Storage System (DDSS) 100, in accordance with some embodiments of the present disclosure.

In an embodiment, the DDSS 100 may include a controller pool 105 including one or more controllers $105_1$-$105_N$ and a storage pool 103 including one or more storage nodes $103_1$-$103_N$, however embodiments are not limited thereto. Although FIG. 1 illustrates the controller pool 105 as including N controllers and the storage pool 103 as including N storage nodes, embodiments are not limited thereto. For example, in embodiments the controller pool 105 may include any number of controllers, and the storage pool can include any number of storage nodes. In the DDSS 100, each of the one or more controllers $105_1$-$105_N$ in the controller pool 105 may be associated with each of the one or more storage nodes $103_1$-$103_N$ in the storage pool 103. In an embodiment, each of the one or more controllers $105_1$-$105_N$ may access each of the one or more storage nodes $103_1$-$103_N$ to perform one or more operations. This may enable efficient use of computing resources by decoupling the computation and storage resources for scalability and flexibility. As an example, the one or more operations may include reading data, writing data, erasing data and the like, however embodiments are not limited thereto. As an example, the one or more storage nodes $103_1$-$103_N$ may include a physical server with one or more Solid State Drives (SSDs). Specifically, the one or more storage nodes $103_1$-$103_N$ may serve as non-volatile storage devices configured to store data regardless of whether power is supplied thereto and have large storage capacity. In an example, the one or more storage nodes $103_1$-$103_N$ may include flash memories having a Two-Dimensional (2D) structure or a Three-Dimensional (3D) structure, for example a vertical NAND (V-NAND) structure. The one or more storage nodes $103_1$-$103_N$ may be devices to which a standard protocol may be applied. The standard protocol may include, for example, a Universal Flash Storage (UFS) protocol, an embedded multi-media card (eMMC) protocol, or a Non-Volatile Memory express (NVMe) protocol, however embodiments are not limited thereto. In an embodiment, the one or more storage nodes $103_1$-$103_N$ may be heterogeneous storage nodes 103, and the one or more storage nodes $103_1$-$103_N$ in the storage pool 103 may have different characteristics. As an example, the one or more storage nodes $103_1$-$103_N$ of the storage pool 103 may have varying storage spaces, different Central Processing Unit (CPU) resources, and the like.

In an embodiment, the storage pool 103 may be accessed by the controller pool 105 over a network 107. As an example, the network 107 may be a Non-Volatile Memory Express over Fabrics (NVMeOF) network. In an embodiment, each of the one or more controllers $105_1$-$105_N$ in the controller pool 105 may be configured to serve requests received from one or more clients 109. In an embodiment, the one or more controllers $105_1$-$105_N$ in the controller pool 105 may be heterogeneous, and the one or more controllers $105_1$-$105_N$ in the controller pool 105 may have different characteristics. As an example, the one or more controllers $105_1$-$105_N$ of the controller pool 105 may have varying configurations in terms of Random Access Memory (RAM), CPU resources, processing speed, and the like. In an embodiment, the replication recovery system 101 may be a computing unit configured to identify an affected node in the storage pool 103, select at least one replacement storage node, select one or more controllers $105_1$-$105_N$ to perform replication recovery operation, and assign one or more replication recovery jobs to the one or more controllers $105_1$-$105_N$ to perform a replication recovery operation. In embodiments, the replication recovery system 101 may be referred to as, for example, a replication recovery unit, a replication recovery module, or a replication recovery device.

The replication recovery system 101 may store information related to each of the one more storage nodes $103_1$-$103_N$ in the storage pool 103 and each of the one or more controllers $105_1$-$105_N$ in the controller pool 105. As an example, the information stored in replication recovery system 101 may include a storage size of each storage node in storage pool 103, a processing speed of each controller in the controller pool 105, and the like, however embodiments are not limited thereto. In an embodiment, controllers included in the DDSS 100 may be upgraded to perform functionalities of the replication recovery system 101, in accordance with the embodiments of the present disclosure.

In an embodiment, the replication recovery system 101 may be configured to identify an affected storage node in the storage pool 103 based on occurrence of one or more predefined conditions. The one or more predefined conditions may include power failure, software failure, hardware failure, and an occurrence of natural calamity, however embodiments are not limited thereto. In an embodiment, the affected storage node may include replication data belonging to at least one Data Replica Group (DRG). In an embodiment, the DRG may refer to a set of segments belonging to the one or more storage nodes $103_1$-$103_N$ in which data is replicated. More specifically, each storage node of the set of one or more storage nodes $103_1$-$103_N$ may be selected from a fault domain of a set of fault domains including the DRG. In general, the DRG includes segment information in each storage node. Upon identifying the affected storage node, the replication recovery system 101 may identify one or more affected DRGs corresponding to the affected storage node based on a pre-set replication rule. In some embodiments, the pre-set replication rule may be set by an end-user or a system administrator or any other authorized personnel based on the client requirement. As an example, consider a scenario where replication data is stored in five storage nodes of the one or more storage nodes $103_1$-$103_N$, and one of the five storage nodes is affected due to the power failure. The replication recovery system 101 may identify the affected storage node and identify the one or more DRGs in the affected storage node, upon determining that the pre-set replication rule is not satisfied. In an embodiment, upon identifying the one or more DRGs, the replication recovery system 101 may select a source storage node from the storage pool 103 which includes a healthy replica for each of the one or more affected DRGs based on one or more source storage node selection parameters. The healthy replica may include the replication data to be recovered. The one or more source storage node selection parameters may include current latency from one or more controllers $105_1$-$105_N$ to the source storage node, and current load on the source storage node, however embodiments are not limited thereto. In an embodiment, the replication recovery system 101 may compute a weighted average of the one or more source storage node selection parameters and select the source storage node based on the computed weighted average. However, embodiments are not limited thereto, and any other technique may be used to select the source storage node.

In an embodiment, upon identifying the affected storage node, the replication recovery system 101 may be configured to select at least one replacement storage node from the storage pool 103 to recover replication data stored in the affected storage node. The at least one replacement storage node may be selected based on one or more replacement storage parameters of each of the one or more storage nodes $103_1$-$103_N$. The one or more replacement storage parameters may include a pre-set replication rule, a RAM size, data space, type of flash disks used for storage, wear level of the flash disks based on P/E cycles, Non-Volatile Random-Access Memory (NVRAM) size, Non-Volatile Dual In-Line Memory Module (NVDIMM) size, total number of CPUs available, processing capability of the CPUs, and a Network Interface Card (NIC) throughput, however embodiments are not limited thereto.

In an embodiment, upon selecting the at least one replacement storage node, the replication recovery system 101 may be configured to select one or more controllers $105_1$-$105_N$ for performing a replication recovery operation from the controller pool 105. The one or more controllers $105_1$-$105_N$ is selected based on at least one of time required for recovery by the one or more controllers $105_1$-$105_N$ and bandwidth degradation due to usage of the one or more controllers $105_1$-$105_N$ for the replication recovery operation. In an embodiment, the replication recovery system 101 may determine first selection parameters including the time required for performing the replication recovery operation, and bandwidth degradation due to exclusive usage of one controller and a combination of two or more controllers, based on one or more controller attributes. The replication recovery system 101 may determine time taken for the replication recovery operation using a plurality of combination of controllers. The one or more controller attributes may include a RAM size, total number of recovery CPUs available, processing capability of the CPUs, a size of cache, NIC throughput and latency to at least one replacement storage node, however embodiments are not limited thereto. Upon determining the time required, the replication recovery system 101 may determine a second selection parameter including the time taken to disable a controller from a regular I/O path when the exclusive usage of the controller is desired. As an example, when only one controller is used, the replication recovery system 101 may determine the time taken to disable the controller from the regular I/O path operation, and to exclusively use the controller to perform the replication recovery operation. Thereafter, the replication recovery system 101 may determine number of controllers and combination of controllers to be used to perform the replication recovery operation. The number of controllers and combination of controllers may be determined based on a correlation of at least one of the first selection parameters and the second selection parameters, and predefined threshold values corresponding to the first selection parameters and the second selection parameters. The replication recovery system 101 may select one or a combination of the one or more controllers $105_1$-$105_N$ to perform the replication recovery operation. As an example, consider a scenario in which a combination of the one or more controllers $105_1$-$105_N$ requires X time for performing the recovery operation and has Y amount of bandwidth degradation. Further, consider that, in this scenario, using exclusively a single controller $105_1$ may require a smaller amount of time than "X" for performing the recovery operation, a smaller amount of bandwidth degradation than "Y", and a smaller amount of time to disable the controller when compared to the combination of controllers $105_1$-$105_N$. In such a scenario, the replication recovery system 101 may use the single controller $105_1$ to perform the replication recovery operation instead of the combination of the one or more controllers $105_1$-$105_N$, and may disable the controller $105_1$ from regular I/O path operation.

In an embodiment, upon selecting the one or more controllers $105_1$-$105_N$, the replication recovery system 101 may be configured to assign one or more replication recovery jobs to the one or more controllers $105_1$-$105_N$ to perform the replication recovery operation on the at least one replacement storage node. In an embodiment, the one or more controllers $105_1$-$105_N$ selected by the replication recovery system 101 may read the replication data from a healthy replica of the source storage node and writes the replication data to the at least one replacement storage node selected by the replication recovery system 101. This process may be performed until all of the replication data is recovered. In some embodiments, during the replication recovery operation, the source storage node may be disabled from the regular I/O path until completion of the replication recovery operation. This may help in reducing the time required for performing replication recovery operation as the source storage node is performing only the operations instructed by the one or more controllers $105_1$-$105_N$ for the replication recovery operation. This may be done when there exists more than one healthy replica of the affected DRGs in a different storage node. For example, consider a scenario in which a client 109 has requested to read data for a client operation during the replication recovery operation. The replication recovery system 101 may direct the client 109 request to another storage node from the storage pool 103 that may be storing a healthy replica of the same data. In some embodiments, a part of the source storage node may be utilized for performing the replication recovery operation while the rest of the storage node is utilized for performing regular I/O operations. However, in an embodiment, the replication recovery system 101 may perform the replication recovery operation for each DRG of the affected storage node in sequence or in parallel. In some embodiments, the decision of whether to perform the replication recovery operation for each DRG in sequence or in parallel may be made by the replication recovery system 101 dynamically based on factors that may include, an urgency to access replication data, a priority of operation requiring data stored in the affected storage node, a number of affected DRGs, a number of available source storage nodes and replication storage nodes, a number of controllers available to perform the replication recovery operation, capabilities of the controllers, and capabilities of the source storage nodes and the replication storage nodes, however embodiments are not limited thereto. Upon successful completion of the replication recovery process, the replication recovery system 101 may receive notification from the one or more controllers $105_1$-$105_N$.

Figure 2:
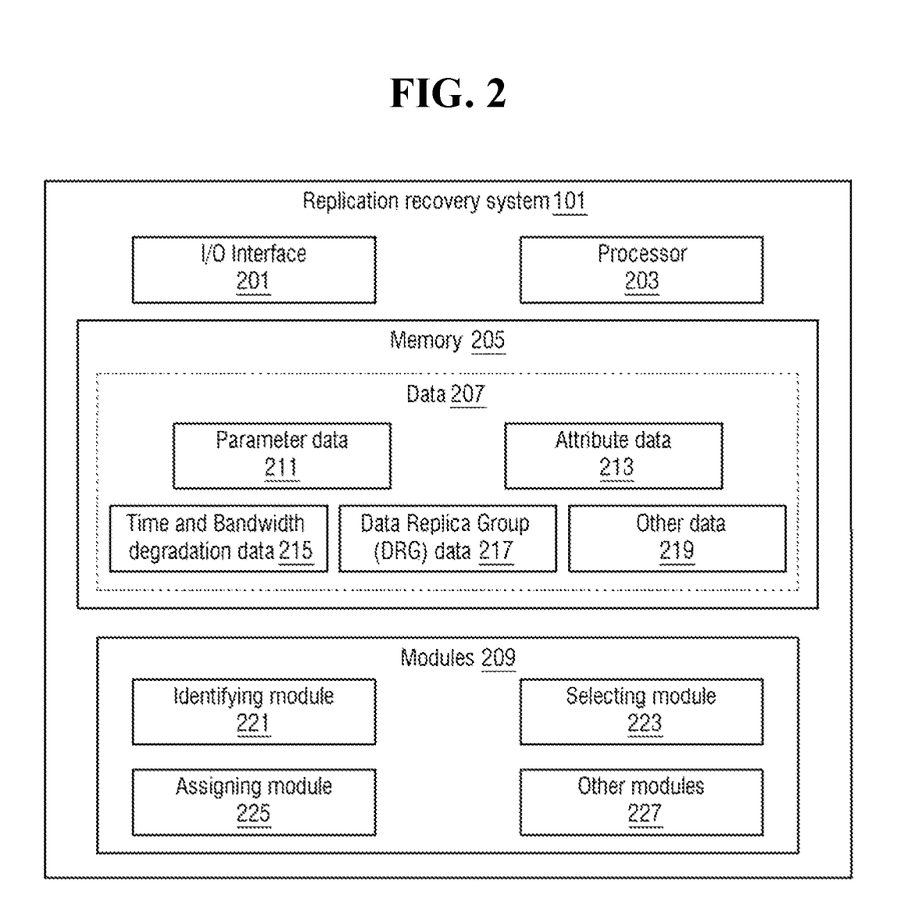
FIG. 2 shows a detailed block diagram of a replication recovery system, in accordance with some embodiments of the present disclosure.

FIG. 2 shows a detailed block diagram of a replication recovery system 101, in accordance with some embodiments of the present disclosure.

In embodiments, the replication recovery system 101 may include an I/O interface 201, a processor 203 and a memory 205. In an embodiment, the memory 205 may be communicatively coupled to the processor 203. The processor 203 may be configured to perform one or more functions of the replication recovery system 101 for performing replication recovery operation in the DDSS 100, using the data 207 and the one or more modules 209 of the replication recovery system 101. In an embodiment, the memory 205 may store data 207.

In an embodiment, the data 207 stored in the memory 205 may include parameter data 211, time and bandwidth degradation data 213, DRG data 215, attribute data 217 and other data 219, however embodiments are not limited thereto. In embodiments, the data 207 may be stored within the memory 205 in the form of various data structures. Additionally, the data 207 may be organized using data models, such as relational or hierarchical data models. The other data 219 may include various temporary data and files generated by the one or more modules 209.

In an embodiment, the parameter data 211 may include one or more replacement storage node parameters, for example parameters which may be used to select the replacement storage node. The one or more replacement storage node parameters may include a pre-set or predetermined replication rule, a RAM size, data space, type of flash disks used for storage, wear level of the flash disks based on P/E cycles, NVRAM size, NVDIMM size, total number of CPUs available, processing capability of the CPUs, and a NIC throughput, however embodiments are not limited thereto. The pre-set replication rule may be set by an end-user and a system administrator based on a client requirement. In some embodiments, the parameter data 211 may include one or more source storage node selection parameters, for example parameters which may be used to select the one or more source storage nodes. The one or more source storage node selection parameters may include latency from one or more controllers $105_1$-$105_N$ to the source storage node, and current load on the source storage node, however embodiments are not limited thereto. The latency from one or more controllers $105_1$-$105_N$ to the source storage node may be the time the one or more controllers $105_1$-$105_N$ take to access the source storage node and read replication data stored in the source storage node. The current load on the source storage node may be the current processing taking place in the source storage node. As an example, the source storage node may be occupied with the client I/O operation.

In an embodiment, the attribute data 213 may include attributes used to select the one or more controllers $105_1$-$105_N$ to perform replication recovery operation. The one or more controller attributes may include a RAM size, total number of recovery CPUs available, processing capability of the CPUs, a size of cache, NIC throughput, and latency to at least one replacement storage node, however embodiments are not limited thereto. The latency to the at least one replacement storage node indicates the time the one or more controllers $105_1$-$105_N$ take to process and transmit the replication data to the at least one replacement storage node.

In an embodiment, the time and bandwidth degradation data 215 may be used to select one or more controllers $105_1$-$105_N$ to perform replication recovery operation. The time and bandwidth degradation data 215 may be calculated based on attribute data 213 of the one or more controllers $105_1$-$105_N$. The time and bandwidth degradation data 215 may be calculated for an exclusive usage of one controller, and for a combination of two or more controllers. The time and bandwidth degradation data 215 may be compared with predefined threshold values to select the one or more controllers $105_1$-$105_N$.

In an embodiment, the attribute data 213 may store data related to the one or more DRGs present in the storage pool 103. As an example, the data may include size of the DRGs, location of the DRGs, replication factor of the DRGs, and the like, however embodiments are not limited thereto. The DRG may refer to a set of segments belonging to one or more storage nodes $103_1$-$103_N$ in which data is replicated. More specifically, each storage node of the set of the one or more storage nodes $103_1$-$103_N$ may be selected from a fault domain of a set of fault domains including the DRG. In general, the DRG includes segment information in each storage node.

In an embodiment, the data 207 may be processed by the one or more modules 209 of the replication recovery system 101. In embodiments, the one or more modules 209 may be communicatively coupled to the processor 203 for performing one or more functions of the replication recovery system 101. In an implementation, the one or more modules 209 may include an identifying module 221, a selecting module 223, an assigning module 225 and other modules 227, however embodiments are not limited thereto.

As used herein, the term module may refer to an Application Specific Integrated Circuit (ASIC), an electronic circuit, a hardware processor (shared, dedicated, or group) and memory that may execute one or more software or firmware programs, a combinational logic circuit, and/or other suitable components that provide the described functionality. In an implementation, each of the one or more modules 209 may be configured as stand-alone hardware computing units. In an embodiment, the other modules 227 may be used to perform various miscellaneous functionalities on the replication recovery system 101. It will be appreciated that such one or more modules 209 may be represented as a single module or a combination of different modules.

In an embodiment, the identifying module 221 may identify an affected storage node in the storage pool 103 based on an occurrence of one or more predefined conditions. The predefined conditions may include power failure, software failure, hardware failure, and an occurrence of natural calamity, however embodiments are not limited thereto. Upon identifying the affected storage node, the identifying module 221 may identify one or more affected DRGs corresponding to the affected storage node based on a pre-set replication rule. Consider an exemplary scenario in which a client has set the replication rule as five, which may mean there exists five copies of the replication data in the one or more storage nodes $103_1$-$103_N$. Due to power failure, the data in a third storage node $103_3$ may be lost. Because the replication rule in this scenario is set as five, there may be five copies of the replication data stored in different storage nodes. In this scenario, based on the identifying module 221 detecting an occurrence of the one or more predefined conditions, the identifying module 221 may identify one or more affected DRGs which may be affected due to the affected storage node $103_3$.

In an embodiment, the selecting module 223 may select at least one replacement storage node from the storage pool 103 to recover replication data stored in the affected storage node, based on the one or more replacement storage parameters of each of the one or more storage nodes $103_1$-$103_N$. The selecting module 223 may also select one or more controllers $105_1$-$105_N$ for performing a replication recovery operation from the controller pool 105 based on at least one of time required for recovery by the one or more controllers $105_1$-$105_N$ and bandwidth degradation due to usage of the one or more controllers $105_1$-$105_N$ for the replication recovery operation.

An exemplary process of selecting one or more controllers $105_1$-$105_N$ using an exemplary equation is explained below. The selecting module 223 may determine first selection parameters including the time required for recovery for performing the replication recovery operation and bandwidth degradation due to exclusive usage of one controller and a combination of two or more controllers, based on the one or more controller attributes.

The time required for the combination of two or more controllers may be determined as attribute matrix A shown in below Equation (1):

$$A = \begin{pmatrix} th_1 & ram_1 & nic_1 & \cdots \\ th_2 & ram_2 & nic_2 & \cdots \\ \vdots & \vdots & \ddots & \vdots \\ th_N & ram_N & nic_N & \cdots \end{pmatrix} \quad (1)$$

The attribute matrix A may be expressed as $A=(a_{ij})$, in which $a_{ij}$ may denote the value of a jth attribute for an ith controller.

The attribute matrix A may have dimensions N×M, where N is the number of the one or more controllers $105_1$-$105_N$, and M is the number of the one or more controller attributes. As an example, the one or more controller attributes may include a number of threads (recovery threads) available, RAM available, and NIC throughput, however embodiments are not limited thereto.

Each attribute may be normalized to obtain $A_N$ which may be expressed as shown in the below Equation (2):

$$A_n = (a_{N_{ij}}) = \frac{a_{ij}}{\sum_{i=1}^{i=N} a_{ij}}, \forall j \in [1, M] \quad (2)$$

A weighted average of each of these normalized attributed may be used to compute a normalized weight matrix $W=(w_i)$ for each controller i. W may be calculated using the below Equation (3):

$$W = wi = \sum_{j=1}^{j=M} a_{N_{ij}}, \forall i \in [1, N] \quad (3)$$

These weights give the proportion in which recovery jobs are distributed to each of the one or more controllers $105_1$-$105_N$. If $T_d$ is used to denote the total amount of data to be recovered due to the node failure, then the data to be recovered by an $i^{th}$ controller may be denoted by $R_{data}(i)$, may be calculated using the below Equation (4):

$$R_{data}(i) = w_i \times T_d, \forall i \in [1,N] \quad (4)$$

This may be used to determine the distribution of recovery jobs to controllers for replication recovery operation based on a combination of two or more controllers.

For the $i^{th}$ controller, the number of recovery threads available for performing replication recovery operation may be denoted as $th_i$, and the average recovery bandwidth per thread of the $i^{th}$ controller may be denoted $B_r(i)$.

Further, the total recovery bandwidth for the $i^{th}$ controller may be denoted $T_{BW}(i)$, which may be calculated using the below Equation (5):

$$T_{BW}(i) = th_i \times B_r(i), \forall i \in [1, N_c] \quad (5)$$

From equation (4) the data to be recovered by the $i^{th}$ controller is denoted $R_{data}(i)$. Therefore, an $R_{data}(i)$ amount of data may be read, and an $R_{data}(i)$ amount of data may be written.

the total time taken for replication recovery operation by the $i^{th}$ controller may be denoted $T_r(i)$, which may be calculated using the below Equation (6):

$$T_r(i) = \frac{2 \times R_{data}(i)}{T_{BW}(i)}, \forall i \in [1, N_c] \quad (6)$$

Therefore, the total time taken for replication recovery operation of all the affected data with the combination of two or more controllers $T_r$, may be calculated using the below Equation (7):

$$T_r = \sum_{i=1}^{i=N_c} T_r(i) \quad (7)$$

The time required for an exclusive controller may be determined as discussed below.

For the exclusive usage of a single controller of the one or more controllers $105_1$-$105_N$, all resources in the single controller may be used to perform replication recovery operation. Therefore, all of the recovery threads and the front-end threads and all the NICs in the single controller may be used to perform the data recovery.

The total amount of data to be recovered may be denoted $T_d$. The availability of all of the NICs in the single controller, which may be referred to below as the $i^{th}$ controller, may be used to exclusively perform replication recovery operation. The theoretical maximum bandwidth of the $i^{th}$ controller based on NICs saturation may be denoted as $B_{max}(i)$. Therefore, the recovery time for the $i^{th}$ controller when used exclusively for recovery may be denoted as $T_{rex}(i)$, which may be calculated using the below Equation (8):

$$T_{rex}(i) = \frac{2 * T_d}{B_{max}(i)}, \forall i \in [1, N_c] \quad (8)$$

The bandwidth degradation due to the combination of two or more controllers, which may be referred to as a cluster of controllers, may be determine as discussed below:

The total bandwidth of the $i^{th}$ controller may be denoted as $B(i)$, which may be dependent on NIC capabilities. Therefore, the total bandwidth of the cluster may be denoted as $BW_{cluster}$, which may be calculated using the below Equation (9):

$$BW_{cluster} = \sum_{i=1}^{i=N_c} B(i) \quad (9)$$

The above Equation 9 is based on an assumption that no background operation is ongoing. If background operations such as replication recovery are ongoing, this bandwidth may be reduced by some amount. In ideal terms, the bandwidth utilized in the $i^{th}$ controller by the recovery threads will be the amount by which the bandwidth reduces. Equation (5) determines that the $T_{BW}(i)$ is the recovery bandwidth of the $i^{th}$ controller. Therefore, the degradation in total bandwidth in each controller may be denoted $B_{deg}$ and may be calculated using the below Equation (10):

$$B_{deg}(i) = \alpha \times T_{BW}(i), \forall i \in [1, N_c] \quad (10)$$

where $\alpha \in [1, \infty)$. Under ideal conditions, $\alpha = 1$. So, the total degradation in performance $B_{deg}(cluster)$ may be calculated using the below Equation (11):

$$B_{deg}(Cluster) = \sum_{i=1}^{i=N_c} B_{deg}(i) \quad (11)$$

As an example, the bandwidth reduction due to the disabling of the exclusive controller, may be $B(i)$, which may be the total bandwidth being contributed to the IO path by the $i^{th}$ controller.

Further, the selecting module 223 may determine second selection parameter including the time taken to disable a controller from a regular I/O path when the exclusive usage of the controller is desired.

The time taken to disable a controller from a regular I/O path when exclusive controller is used may be denoted as $T_{dis}$.

Thereafter, the selecting module 223 may determine number of controllers and combination of controllers to be used for performing the replication recovery operation based on correlation of the at least one of the first selection parameters and the second selection parameters with predefined threshold values corresponding to the first selection parameters and the second selection parameters.

An exemplary equation to select one or more controllers $105_1$-$105_N$ to perform replication recovery operation is shown below.

For each $i \in [1, Nc]$, checks may be performed according to the following Equation 12 and Equation 13:

$$T_{rex}(i) + T_{dis} < \alpha * T_r \quad (12)$$

$$B(i) < \beta * B_{deg}(Cluster) \quad (13)$$

In Equation 12 and Equation 13, $\alpha, \beta \in (0, 1]$ i.e., any value between 0 and 1. For example, $\alpha$ may be 0.8, $\beta$ may be 0.6 or any other value between 0 and 1.

If both of Equation 12 and Equation 13 are valid, then the selecting module 223 may perform replication recovery operation using exclusively one controller, for example the $i^{th}$ controller. The one or more controllers $105_1$-$105_N$ consuming minimum execution time may be collected in a list.

The selecting module 223 may select one controller from the list of possible controllers present in the list, for example based on which controller has least $T_{rex}$.

However, selecting controller based on least $T_{rex}$ should not be construed as a limitation of the present disclosure, as the controller may be selected using any other method to perform replication recovery operation, and such other method falls within the scope of the present disclosure. For example, a controller having a lowest load of regular I/O operations may be selected for performing the replication recovery operation, a combination of controllers having a maximum thread allocation for performing replication recovery may be selected, a combination of controllers having predefined properties related to controller capabilities may be selected, etc.

In an embodiment, the assigning module 225 may assign one or more replication recovery jobs to the one or more controllers $105_1$-$105_N$ to perform the replication recovery operation on the at least one replacement storage node. Thereafter, the one or more controllers $105_1$-$105_N$ that are assigned to the one or more replication recovery jobs may read the replication data from a healthy replica of a source storage node, and write the replication data to the at least one replacement storage node. During the replication recovery operation, the source storage node may be disabled from the regular I/O path until completion of the replication recovery operation. Upon completion of the one or more replication recovery jobs, the replication recovery system 101 may receive notification from the one or more controllers $105_1$-$105_N$.

Example 1, discussed below, is an exemplary scenario which uses exemplary values for using a combination of two or more controllers.

According to Example 1, a system of three controllers, for example first controller $105_1$, second controller $105_2$, and third controller $105_3$, may have the following capabilities:

First controller $105_1$: 16 Frontend CPUs, 4 backend CPUs, 256 Gigabytes (GB) RAM, 100 Gigabit (Gbit) NIC Second controller $105_2$: 20 Frontend CPUs, 8 backend CPUs, 512 GB RAM, 100 Gbit NIC Third controller $105_3$: 16 Frontend CPUs, 4 backend CPUs, 256 GB RAM, 100 Gbit NIC According to Example 1, the attribute matrix for these controllers may be given by the below Equation 14:

$$A = \begin{pmatrix} 4 & 256 & 100 \\ 8 & 512 & 100 \\ 4 & 256 & 100 \end{pmatrix} \quad (14)$$

Upon normalizing each attribute to obtain $A_N$, the matrix may be as shown in the below Equation 15:

$$A_N = \begin{pmatrix} 0.25 & 0.25 & 0.33 \\ 0.5 & 0.5 & 0.33 \\ 0.25 & 0.25 & 0.33 \end{pmatrix} \quad (15)$$

Further, using $A_N$, a weight matrix is obtained, which may be shown in the below Equation 16:

$$W = \begin{pmatrix} 0.25 \\ 0.5 \\ 0.25 \end{pmatrix} \quad (16)$$

In Example 1, the bandwidth associated with each thread (frontend and backend) may be 0.5 Gb/s.

According to Example 1, consider one of the one or more storage nodes $103_1$-$103_N$ has failed, and the data to be recovered is Td=1000 GB of data.

Using Equation 14 and Equation 16, the amount of data to be recovered by each controller may be derived as: $R_{data}$ (first controller $105_1$)=250, $R_{data}$(second controller $105_2$)= 500 and $R_{data}$(third controller $105_3$)=250.

The time taken by each controller to recover $R_{data}$(i) of data may be shown in the below Equation 17, Equation 18, and Equation 19:

$$T_r(\text{first controller } 105_1) = \frac{2*250}{2} = 250 \text{ seconds} \quad (17)$$

$$T_r(\text{second controller } 105_2) = \frac{2*500}{4} = 250 \text{ seconds} \quad (18)$$

$$T_r(\text{third controller } 105_3) = \frac{2*250}{2} = 250 \text{ seconds} \quad (19)$$

Therefore, the total recovery time=Maximum of all recovery times=250 seconds.

The bandwidth degradation due to using the three controllers each for recovery as described above may be determined as follows:

First controller $105_1$: 16 frontend CPUs takes up 8 GB/s of NIC bandwidth and adding another 2 Gb/s worth of recovery (due to 4 recovery threads), this gives 10 Gb/s of NIC bandwidth in total which is less than the 12 Gb/s guaranteed by the 100 Gbit NIC. Therefore, there is 0 degradation from the first controller $105_1$.

Second controller $105_2$: 20 Frontend CPUs contributes to 10 GB/s of NIC utilization. But 4 Gb/s for recovery is required (due to 8 recovery threads). But a 100 Gbit NIC can at maximum give 12 Gb/s. Therefore, the degradation is 2 Gb/s degradation in the second controller $105_2$.

Third controller $105_3$: Similar to the first controller $105_1$, there may be 0 degradation due to the third controller $105_3$.

Therefore the total degradation in the cluster performance may be: Bdeg(Cluster)=2 GB/s Considering Each Controller Individually for Recovery:

The time taken by each controller if all resources are used for recovering the full $T_d$ amount of data may be shown in the below Equation 20, Equation 21, and Equation 22:

$$T_{rex}(\text{first controller } 105_1) = \frac{2*1000}{12} = 166.66 \text{ seconds} \quad (20)$$

$$T_{rex}(\text{second controller } 105_2) = \frac{2*1000}{12} = 166.66 \text{ seconds} \quad (21)$$

$$T_{rex}(\text{third controller } 105_3) = \frac{2*1000}{12} = 166.66 \text{ seconds} \quad (22)$$

The time taken to disable each controller if they were to be used exclusively for recovery may be shown in the below Equation 23, Equation 24, and Equation 25:

$$T_{dis}(\text{first controller } 105_1) = \frac{256}{2} = 128 \text{ seconds} \quad (23)$$

$$T_{dis}(\text{second controller } 105_2) = \frac{512}{4} = 128 \text{ seconds} \quad (24)$$

$$T_{dis}(\text{third controller } 105_3) = \frac{256}{2} = 128 \text{ seconds} \quad (25)$$

Therefore, for each of the first, second and third controllers $105_1$, $105_2$, and $105_3$: $T_{dis}(i)+T_{rex}(i)$=128+166.66=294.66 seconds.

This is much higher than total recovery time when using all controllers=250 seconds.

Therefore, according to Example 1, the replication recovery system 101 may select combination of all of the first, second and third controllers $105_1$, $105_2$, and $105_3$ for performing replication recovery operation rather than selecting an exclusive controller.

Example 2, discussed below, is an exemplary scenario which exemplary values for using an exclusive controller.

First controller $105_1$: 12 Frontend CPUs, 6 backend CPUs, 256 GB RAM, 50 Gbit NIC Second controller $105_2$: 48 Frontend CPUs, 24 backend CPUs, 256 GB RAM, 200 Gbit NIC Third controller $105_3$: 24 Frontend CPUs, 12 backend CPUs, 256 GB RAM, 100 Gbit NIC According to Example 2, the attribute matrix for these controllers may be given by the below Equation 25:

$$A = \begin{pmatrix} 6 & 256 & 50 \\ 24 & 256 & 200 \\ 12 & 256 & 100 \end{pmatrix} \quad (25)$$

Upon normalizing each attribute to obtain $A_N$, the matrix may be as shown in the below Equation 26:

$$A_N = \begin{pmatrix} 0.142 & 0.33 & 0.142 \\ 0.572 & 0.33 & 0.572 \\ 0.284 & 0.33 & 0.284 \end{pmatrix} \quad (26)$$

Further, using $A_N$, weight matrix is obtained, which may be shown in the below Equation 27:

$$W = \begin{pmatrix} 0.21 \\ 0.49 \\ 0.30 \end{pmatrix} \quad (27)$$

In Example 2 the bandwidth associated with each thread (frontend and backend) may be 0.5 Gb/s.

According to Example 2, one of the of the one or more storage nodes $103_1$-$103_N$ has failed and the data to be recovered is $T_d$=1000 GB of data.

Using Equation 25 and Equation 27, the amount of data to be recovered by each controller may be derived as: $R_{data}$(first controller $105_1$)=210, $R_{data}$(second controller $105_2$)=490 and $R_{data}$(third controller $105_3$)=300.

The time taken by each controller to recover $R_{data}$(i) of data is show in the below Equation 28, Equation 29, and Equation 30:

$$T_r(1) = \frac{2*210}{3} = 140 \text{ seconds} \quad (28)$$

-continued $$T_r(2) = \frac{2*490}{12} = 81.66 \text{ seconds} \quad (29)$$

$$T_r(3) = \frac{2*300}{6} = 100 \text{ seconds} \quad (30)$$

Therefore, the total recovery time=Maximum of all recovery times=140 seconds.

The bandwidth degradation due to usage of three controllers each for recovery as described above may be determined as follows:

First controller $105_1$: 12 frontend CPUs use 6 Gb/s of NIC bandwidth. When recovery occurs, the 6 backend thread may use 3 Gb/s of the NIC bandwidth. That means a 3 Gb/s degradation occurs.

Second controller $105_2$: 48 frontend CPUs use 24 GB/s of the NIC Bandwidth. When recovery occurs 12 Gb/s of the NIC bandwidth may be used. This results in a 12 Gb/s degradation.

Third controller $105_3$: 24 frontend CPUs uses 12 Gb/s of the NIC bandwidth. When recovery occurs 6 Gb/s may be used. This results in a 6 Gb/s degradation.

Therefore the total degradation in the cluster performance may be: Bdeg(Cluster)=3+12+6=21 GB/s Considering Each Controller Individually for Recovery:

The time taken by each controller if all resources are used for recovering the full Ta amount of data may be shown in the below Equation 31, Equation 32, and Equation 33:

$$T_{rex} \text{ (first controller } 105_1) = \frac{2*1000}{6} = 333.33 \text{ seconds} \quad (31)$$

$$T_{rex}(\text{second controller } 105_2) = \frac{2*1000}{24} = 83.33 \text{ seconds} \quad (32)$$

$$T_{rex}(\text{Third controller } 105_3) = \frac{2*1000}{12} = 166.66 \text{ seconds} \quad (33)$$

The time taken to disable each controller if they were to be used exclusively for recovery may be shown in the below Equation 34, Equation 35, and Equation 36:

$$T_{dis}(\text{first controller } 105_1) = \frac{256}{3} = 85.33 \text{ sec} \quad (34)$$

$$T_{dis}(\text{second controller } 105_2) = \frac{256}{12} = 21.33 \text{ sec} \quad (35)$$

$$T_{dis}(\text{Third controller } 105_3) = \frac{256}{6} = 42.67 \text{ sec} \quad (36)$$

Therefore, for the second controller $105_2$: $T_{dis}$(second controller $105_2$)+$T_{rex}$(second controller $105_2$)=21.33+83.33=104.66 sec This is lower than the recovery time when using all controllers which is 140 seconds.

Moreover, the $B_{deg}$(Cluster) is same as the degradation in performance when the second controller $105_2$ is exclusively used for recovery.

Therefore, according to Example 2, the replication recovery system may select the second controller $105_2$ exclusively for performing replication recovery operation rather than the combination of the first, second and third controllers $105_1$, $105_2$, and $105_3$.

Figure 3:
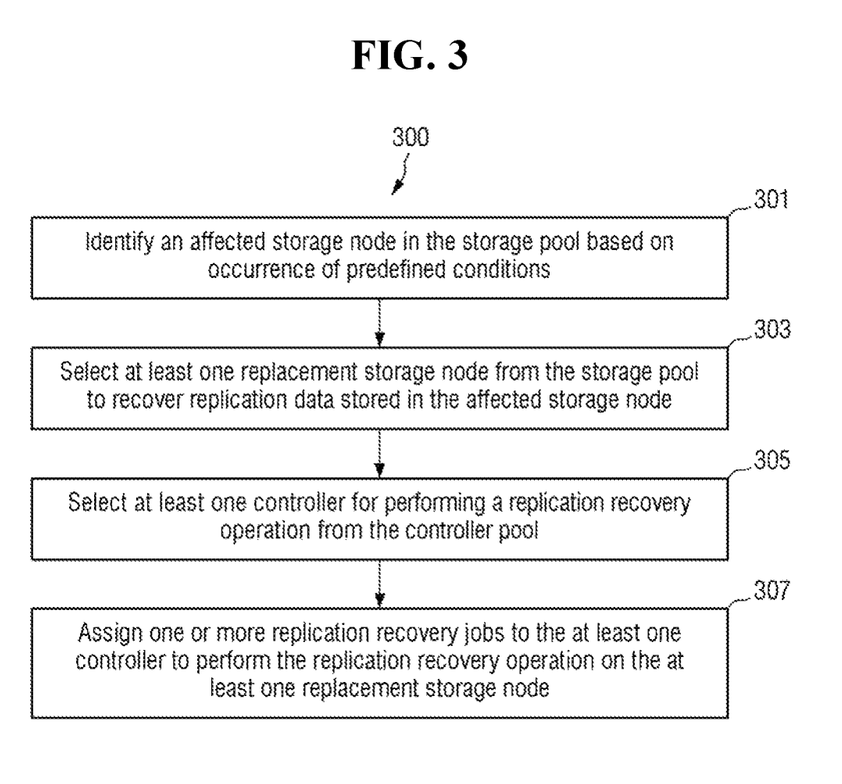
FIG. 3 shows a flowchart illustrating a method of performing replication recovery operation in a DDSS, in accordance with some embodiments of the present disclosure.

FIG. 3 shows a flowchart illustrating a process of performing replication recovery operation in the DDSS 100, in accordance with some embodiments of the present disclosure.

As illustrated in FIG. 3, the process 300 may include one or more blocks of method of performing replication recovery operation in the DDSS 100 as illustrated in FIG. 1, for example using a replication recovery system 101 as illustrated in FIG. 2. The process 300 may be described in the general context of computer executable instructions, which may include for example routines, programs, objects, components, data structures, procedures, modules, and functions, which may perform specific functions or implement specific abstract data types.

The order in which the process 300 is described is not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

At block 301, the process 300 includes identifying, by the processor 203 of the replication recovery system 101, an affected storage node in the storage pool 103 based on occurrence of one or more predefined or predetermined conditions. The affected storage node may include the replication data belonging to at least one DRG. The one or more predefined conditions may include at least one of power failure, software failure, hardware failure, and an occurrence of natural calamity, however embodiments are not limited thereto. In an embodiment, upon identifying the affected storage node, the processor 203 may identify the one or more affected DRGs corresponding to the affected storage node based on a pre-set replication rule. In an embodiment, a source storage node from the storage pool 103 including a healthy replica for each of the one or more affected DRGs is selected based on one or more source storage node selection parameters. The healthy replica may include the replication data to be recovered. In some embodiments, the one or more source storage node selection parameters may include at least one of latency from one or more controllers $105_1$-$105_N$ to the source storage node and current load on the source storage node, however embodiments are not limited thereto.

At block 303, the process 300 includes selecting, by the processor 203, at least one replacement storage node from the storage pool 103 to recover replication data stored in the affected storage node, based on one or more replacement storage parameters of each of the one or more storage nodes $103_1$-$103_N$. The one or more replacement storage parameters may include at least one of a replication rule set by an end user, a RAM size, data space, type of flash disks used for storage, wear level of the flash disks based on P/E cycles, NVRAM size, NVDIMM size, total number of CPUs available, processing capability of the CPUs and a NIC throughput, however embodiments are not limited thereto.

At block 305, the process 300 includes selecting, by the processor 203, one or more controllers $105_1$-$105_N$ for performing a replication recovery operation from the controller pool 105 based on at least one of time required for recovery by the one or more controllers $105_1$-$105_N$ and bandwidth degradation due to usage of the one or more controllers $105_1$-$105_N$ for the replication recovery operation. In an embodiment, the processor 203 may determine first selection parameters including the time required for recovery for performing the replication recovery operation and bandwidth degradation due to exclusive usage of one controller and a combination of two or more controllers is determined, based on one or more controller attributes. Further, the processor 203 may determine second selection parameter including the time taken to disable a controller from a regular I/O path is determined when the exclusive usage of the controller is desired. Thereafter, the processor 203 may determine number of controllers and combination of controllers to be used for performing the replication recovery operation is determined based on correlation of the at least one of the first selection parameters and the second selection parameters with predefined threshold values corresponding to the first selection parameters and the second selection parameters. In an embodiment, the replication recovery operation may include reading the replication data from a healthy replica of a source storage node and writing the replication data to the at least one replacement storage node. In an embodiment, the one or more controller attributes of the one or more controllers $105_1$-$105_N$ may include a RAM size, total number of recovery CPUs available, processing capability of the CPUs, a size of cache, NIC throughput, and latency to at least one replacement storage node, however embodiments are not limited thereto.

At block 307, the process 300 includes assigning, by the processor 203, one or more replication recovery jobs to the one or more controllers $105_1$-$105_N$ to perform the replication recovery operation on the at least one replacement storage node. In an embodiment, during the replication recovery operation, the processor 203 may disable a source storage node from regular I/O path is until completion of the replication recovery operation. The processor 203 may receive notification from the one or more controllers $105_1$-$105_N$ upon completion of the one or more replication recovery jobs.

Figure 4:
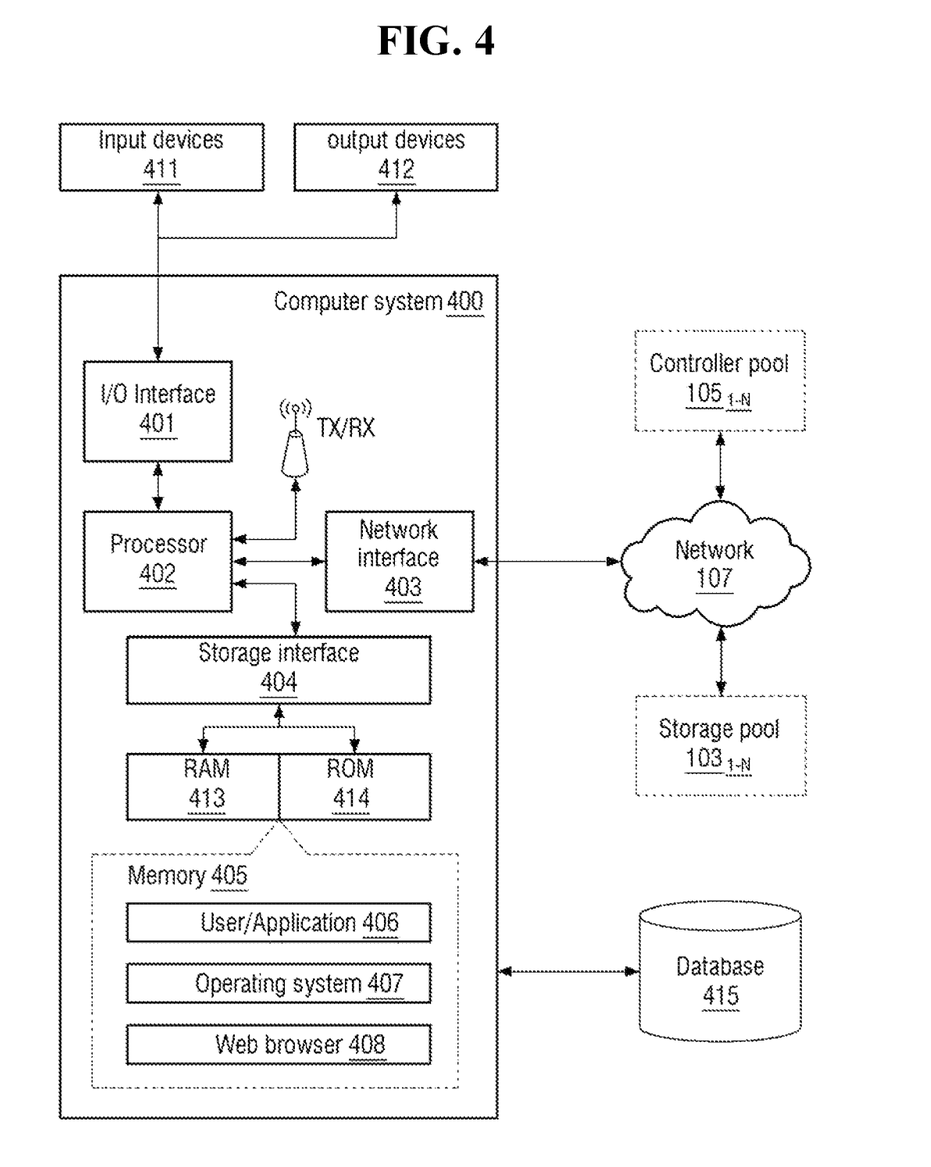
FIG. 4 illustrates a block diagram of an exemplary computer system for implementing embodiments consistent with the present disclosure.

FIG. 4 illustrates a block diagram of an exemplary computer system 400 for implementing embodiments consistent with the present disclosure. In an embodiment, the computer system 400 may be, or correspond to, the replication recovery system 101 illustrated in FIG. 1. The computer system 400 may include a processor 402, which may be referred to as a CPU or a memory controller. The processor 402 may comprise at least one data processor for executing program components for executing user- or system-generated business processes. A user may include a network manager, an application developer, a programmer, an organization or any system/sub-system being operated in parallel with the computer system 400. The processor 402 may include specialized processing units such as integrated system controllers, bus controllers, memory controllers/memory management control units, floating point units, graphics processing units, digital signal processing units, etc.

The processor 402 may communicate with one or more I/O devices, for example input devices 411 and output devices 412, via I/O interface 401. The I/O interface 401 may employ communication protocols/methods such as audio, analog, digital, stereo, IEEE®-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE® 802.n/b/g/n/x, Bluetooth, cellular (e.g., Code-Division Multiple Access (CDMA), High-Speed Packet Access (HSPA+), Global System For Mobile Communications (GSM), and Long-Term Evolution (LTE) or the like), however embodiments are not limited thereto. Using the I/O interface 401, the computer system 400 may communicate with one or more I/O devices 411 and 412.

In some embodiments, the processor 402 may communicate with a network 107 via a network interface 403. As an example, the network 107 may be a NVMeOF network. The network interface 403 may communicate with the network 107. The network interface 403 may employ connection protocols such as a direct connect protocol, an Ethernet (e.g., twisted pair 10/100/1000 Base T) protocol, a Transmission Control Protocol/Internet Protocol (TCP/IP) protocol, a token ring protocol, and an IEEE® 802.11a/b/g/n/x protocol, however embodiments are not limited thereto.

In an implementation, the preferred network 107 may be implemented as one of the several types of networks, such as intranet or Local Area Network (LAN) and such within the organization. The preferred network 107 may either be a dedicated network or a shared network, which represents an association of several types of networks that use a variety of protocols, for example, Hypertext Transfer Protocol (HTTP), Transmission Control Protocol/Internet Protocol (TCP/IP), Wireless Application Protocol (WAP) etc., to communicate with each other. Further, the network 107 may include a variety of network devices, including routers, bridges, servers, computing devices, storage devices, etc.

In some embodiments, the processor 402 may be disposed in communication with a memory 405 (e.g., RAM 413, ROM 414, etc. as shown in FIG. 4) via a storage interface 404. The storage interface 404 may connect to memory 405, which may include for example memory drives, removable disc drives, etc., employing connection protocols such as Serial Advanced Technology Attachment (SATA), Integrated Drive Electronics (IDE), IEEE-1394, Universal Serial Bus (USB), fiber channel, and Small Computer Systems Interface (SCSI), however embodiments are not limited thereto. The memory drives may further include a drum, magnetic disc drive, magneto-optical drive, optical drive, Redundant Array of Independent Discs (RAID), solid-state memory devices, solid-state drives, etc. The computer system 400 is depicted to be operatively associated with a database 415. The database 415 may store information related to each of the one more storage nodes $103_1$-$103_N$ in the storage pool 103 and each of the one or more controllers $105_1$-$105_N$ in the controller pool 105.

The memory 405 may store a collection of program or database components, which may include a user/application interface 406, an operating system 407, a web browser 408, and the like, however embodiments are not limited thereto. In some embodiments, computer system 400 may store user/application data 406, such as the data, variables, records, etc. as described in this invention. Such databases may be implemented as fault-tolerant, relational, scalable, secure databases such as Oracle® or Sybase®.

The operating system 407 may facilitate resource management and operation of the computer system 400. Examples of operating systems may include, APPLE® MACINTOSH® OS X®, UNIX®, UNIX-like system distributions (E.G., BERKELEY SOFTWARE DISTRIBUTION® (BSD), FREEBSD®, NETBSD®, OPENBSD, etc.), LINUX DISTRIBUTIONS (E.G., RED HAT®, UBUNTU®, KUBUNTU®, etc.), IBM® OS/2®, MICROSOFT® WINDOWS® (XP®, VISTA®/7/8, 10 etc.), APPLE® IOS®, GOOGLE™ ANDROID™, BLACKBERRY® OS, or the like, however embodiments are not limited thereto.

The user interface 406 may facilitate display, execution, interaction, manipulation, or operation of program components through textual or graphical facilities. For example, the user interface 406 may provide computer interaction interface elements on a display system operatively connected to the computer system 400, such as cursors, icons, check boxes, menus, scrollers, windows, widgets, and the like. Further, Graphical User Interfaces (GUIs) may be employed, which may include GUIs associated with APPLE® MACINTOSH® operating systems' Aqua®, IBM® OS/2®, MICROSOFT® WINDOWS® (e.g., Aero, Metro, etc.), web interface libraries (e.g., ActiveX®, JAVA®, JAVASCRIPT®, AJAX, HTML, ADOBE FLASH®, etc.), or the like, however embodiments are not limited thereto.

The web browser 408 may be a hypertext viewing application. Secure web browsing may be provided using Secure Hypertext Transport Protocol (HTTPS), Secure Sockets Layer (SSL), Transport Layer Security (TLS), and the like. The web browsers 408 may utilize facilities such as AJAX, DHTML, ADOBE FLASH®, JAVASCRIPT®, JAVA®, Application Programming Interfaces (APIs), and the like. Further, the computer system 400 may implement a mail server stored program component. The mail server may utilize facilities such as ASP, ACTIVEX®, ANSI® C++/C #, MICROSOFT®, .NET, CGI SCRIPTS, JAVA®, JAVASCRIPT®, PERL®, PHP, PYTHON®, WEBOBJECTS®, etc. The mail server may utilize communication protocols such as Internet Message Access Protocol (IMAP), Messaging Application Programming Interface (MAPI), MICROSOFT® exchange, Post Office Protocol (POP), Simple Mail Transfer Protocol (SMTP), or the like. In some embodiments, the computer system 400 may implement a mail client stored program component. The mail client may be a mail viewing application, such as APPLE® MAIL, MICROSOFT® ENTOURAGE®, MICROSOFT® OUTLOOK®, MOZILLA® THUNDERBIRD®, and the like.

Furthermore, one or more computer-readable storage media may be utilized in implementing embodiments consistent with the present disclosure. A computer-readable storage medium may refer to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include RAM, Read-Only Memory (ROM), volatile memory, nonvolatile memory, hard drives, Compact Disc (CD) ROMs, Digital Video Disc (DVDs), flash drives, disks, and any other known physical storage media.

Embodiments may ensure flash awareness i.e., the replication recovery system disclosed in the present disclosure may be aware of properties such as version of the NAND device, wear level of the NAND device, P/E cycle of the NAND device and the like. This helps in preventing degradation of the NAND devices.

Embodiments may effectively use the available resources of the storage nodes and the controller to select at least one replacement storage node and at least one controller to perform replication recovery operation. This may help in minimizing the recovery time and also maintaining the client performance during the replication recovery operation.

Embodiments may provide the ability to select any number of controllers and storage nodes to be selected for performing the replication recovery operation, without limiting the controller and storage resources. This helps in enhancing flexibility in the replication recovery process that in turn helps in preventing longer recovery time and also in preventing bandwidth degradation for the regular client I/O operations.

Embodiments may provide the ability to disable the source storage node from which healthy replica copy is accessed and also disable a controller or combination of controllers used for the replication recovery process, from performing the regular I/O operations such that complete ability of the source storage node and the controller or combination of controllers for only the replication recovery operation. This also in turn may help in minimizing the effect of bandwidth degradation for the client.

As stated above, it shall be noted that embodiments may be used to overcome various technical problems related to performing replication recovery operation in a DDSS. In other words, embodiments may have a practical application and provide a technically advanced solution to the technical problems associated with the existing approach into replication recovery operation in the DDSS.

In light of the technical advancements provided by embodiments, the claimed steps, as discussed above, are not routine, conventional, or well-known aspects in the art, because the claimed steps may provide at least the aforesaid solutions to the technical problems existing in the conventional technologies. Further, the claimed steps may clearly bring an improvement in the functioning of the system itself, as the claimed steps provide a technical solution to a technical problem.

The terms "an embodiment", "embodiment", "embodiments", "the embodiment", "the embodiments", "one or more embodiments", "some embodiments", and "one embodiment" mean "one or more (but not all) embodiments of the disclosure" unless expressly specified otherwise.

The terms "including", "comprising", "having" and variations thereof mean "including but not limited to", unless expressly specified otherwise.

The enumerated listing of items does not imply that any or all the items are mutually exclusive, unless expressly specified otherwise. The terms "a", "an" and "the" mean "one or more", unless expressly specified otherwise.

A description of an embodiment with several components in communication with each other does not imply that all such components are required. On the contrary, a variety of optional components are described to illustrate the wide variety of possible embodiments of the disclosure.

When a single device or article is described herein, it will be clear that more than one device/article (whether they cooperate) may be used in place of a single device/article. Similarly, where more than one device/article is described herein (whether they cooperate), it will be clear that a single device/article may be used in place of the more than one device/article or a different number of devices/articles may be used instead of the shown number of devices or programs. The functionality and/or features of a device may be alternatively embodied by one or more other devices which are not explicitly described as having such functionality/features. Thus, other embodiments of the disclosure need not include the device itself.

Finally, the language used in the specification has been principally selected for readability and instructional purposes, and it may not have been selected to delineate or circumscribe the disclosure. It is therefore intended that the scope of the disclosure be limited not by this detailed description, but rather by any claims that issue on an application based here on. Accordingly, the embodiments of the present disclosure are intended to be illustrative, but not limiting, of the scope of the disclosure, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method of performing replication recovery operation in a disaggregated distributed storage system (DDSS), the method comprising:
 identifying, by a replication recovery device associated with a controller pool and a storage pool of the DDSS, an affected storage node included in the storage pool based on an occurrence of one or more predetermined conditions;
 selecting, by the replication recovery device, at least one replacement storage node from among one or more storage nodes included in the storage pool to recover replication data stored in the affected storage node, based on one or more replacement storage parameters corresponding to each of one or more storage nodes included in the storage pool;
 selecting, by the replication recovery device, at least one controller for performing a replication recovery operation from among one or more controllers included in the controller pool, wherein each controller of the one or more controllers is associated with each storage node of the one or more storage nodes, based on at least one of a time required for recovery by the at least one controller and a bandwidth degradation caused by usage of the at least one controller for the replication recovery operation;
 assigning, by the replication recovery device, one or more replication recovery jobs to the at least one controller to perform the replication recovery operation on the at least one replacement storage node; and
 receiving, by the replication recovery device, a notification from the at least one controller based on the one or more replication recovery jobs being completed.

2. The method as claimed in claim 1, wherein the replication data belongs to at least one Data Replica Group (DRG).

3. The method as claimed in claim 1, wherein the one or more predetermined conditions comprises at least one of a power failure, a software failure, a hardware failure, and an occurrence of a natural calamity.

4. The method as claimed in claim 1, wherein upon identifying the affected storage node, the method further comprises:
 identifying, by the replication recovery device, one or more affected DRGs corresponding to the affected storage node based on a predetermined replication rule; and
 selecting, by the replication recovery device, a source storage node from among the one or more storage nodes included in the storage pool, wherein the source storage node includes a healthy replica for each of the one or more affected DRGs based on one or more source storage node selection parameters, wherein the healthy replica includes the replication data to be recovered.

5. The method as claimed in claim 4, wherein the one or more source storage node selection parameters comprises at least one of a latency from the one or more controllers to the source storage node, and a current load on the source storage node.

6. The method as claimed in claim 1, wherein the one or more replacement storage parameters comprises at least one of a predetermined replication rule, a Random Access Memory (RAM) size, a data space, a type of flash disks used for storage, a wear level of the flash disks based on Program/Erase (P/E) cycles, a Non-Volatile Random-Access Memory (NVRAM) size, a Non-Volatile Dual In-Line Memory Module (NVDIMM) size, a total number of Central Processing Units (CPUs) available, a processing capability of the CPUs, and a Network Interface Card (NIC) throughput.

7. The method as claimed in claim 1, wherein the replication recovery operation comprises:
 reading the replication data from a healthy replica of a source storage node; and
 writing the replication data to the at least one replacement storage node.

8. The method as claimed in claim 1, wherein the selecting of the at least one controller for performing the replication recovery operation comprises:
 determining first selection parameters including a time for performing the replication recovery operation, bandwidth degradation caused by exclusive usage of one controller, and bandwidth degradation caused by usage of a combination of two or more controllers, based on one or more controller attributes;
 determining second selection parameters including a time to disable a controller from a regular Input/Output (I/O) path based on the exclusive usage of the controller; and
 determining a number of the one or more controllers and a combination of the one or more controllers to be used for performing the replication recovery operation based on a correlation of at least one of the first selection parameters and the second selection parameters with predefined threshold values corresponding to the first selection parameters and the second selection parameters.

9. The method as claimed in claim 8, wherein the one or more controller attributes include a Random Access Memory (RAM) size, a total number of recovery Central Processing Units (CPUs) available, a processing capability of the recovery CPUs, a size of a cache, a Network Interface Card (NIC) throughput, and a latency to the at least one replacement storage node.

10. The method as claimed in claim 1, further comprising:
 disabling, by the replication recovery device, during the replication recovery operation, a source storage node from a regular I/O path until the replication recovery operation is completed.

11. The method of claim 1, wherein the at least one controller is selected based on a comparison between a threshold value and at least selection parameter associated with at least one of the time required for recovery by the at least one controller and the bandwidth degradation caused by the usage of the at least one controller for the replication recovery operation.

12. A replication recovery device for performing replication recovery operation in a disaggregated distributed storage system (DDSS), the replication recovery device comprising:
 a memory configured to store instructions; and
 a processor configured to execute the instructions to:
  identify an affected storage node in a storage pool of the DDSS based on an occurrence of one or more predetermined conditions,
  select at least one replacement storage node from the storage pool to recover replication data stored in the affected storage node, based on one or more replacement storage parameters corresponding to each of one or more storage nodes included in the storage pool,
  select at least one controller to perform a replication recovery operation from among one or more controllers included in a controller pool of the DDSS, based on at least one of a time required for recovery by the at least one controller, and bandwidth degradation due to usage of the at least one controller to perform the replication recovery operation, and assign one or more replication recovery jobs to the at least one controller to perform the replication recovery operation on the at least one replacement storage node, and receive a notification from the at least one controller based on the one or more replication recovery jobs being completed.

13. The replication recovery device as claimed in claim 12, wherein the replication data belongs to at least one Data Replica Group (DRG).

14. The replication recovery device as claimed in claim 12, wherein the one or more predetermined conditions comprises at least one of a power failure, a software failure, a hardware failure and an occurrence of a natural calamity.

15. The replication recovery device as claimed in claim 12, wherein based on identifying the affected storage node, the processor is further configured to:

identify one or more affected DRGs corresponding to the affected storage node based on a predetermined replication rule; and select a source storage node from among one or more storage nodes included in the storage pool, wherein the source storage node comprises a healthy replica for each of the one or more affected DRGs based on one or more source storage node selection parameters, wherein the healthy replica comprises the replication data to be recovered.

16. The replication recovery device as claimed in claim 15, wherein the one or more source storage node selection parameters comprises at least one of a latency from one or more controller to the source storage node, and a current load on the source storage node.

17. The replication recovery device as claimed in claim 12, wherein the one or more replacement storage parameters comprises at least one of a predetermined replication rule, a Random Access Memory (RAM) size, a data space, a type of flash disks used for storage, a wear level of the flash disks based on Program/Erase (P/E) cycles, a Non-Volatile Random-Access Memory (NVRAM) size, a Non-Volatile Dual In-Line Memory Module (NVDIMM) size, a total number of Central Processing Units (CPUs) available, a processing capability of the CPUs, and a Network Interface Card (NIC) throughput.

18. The replication recovery device as claimed in claim 12, wherein to perform the replication recovery operation, the processor is further configured to:

read the replication data from a healthy replica of a source storage node; and write the replication data to the at least one replacement storage node.

19. The replication recovery device as claimed in claim 12, wherein to select the at least one controller to perform the replication recovery operation, the processor is further configured to:

determine first selection parameters comprising a time for performing the replication recovery operation, a bandwidth degradation caused by exclusive usage of one controller, and a bandwidth degradation caused by a combination of two or more controllers, based on one or more controller attributes;

determine second selection parameters comprising a time to disable a controller from a regular Input/Output (I/O) path based on the exclusive usage of the controller; and determine a number of the one or more controllers and a combination of the one or more controllers to be used to perform the replication recovery operation based on a correlation of at least one of the first selection parameters and the second selection parameters with predefined threshold values corresponding to the first selection parameters and the second selection parameters.

20. The replication recovery device as claimed in claim 19, wherein the one or more controller attributes comprise a Random Access Memory (RAM) size, a total number of recovery Central Processing Units (CPUs) available, a processing capability of the CPUs, a size of cache, a Network Interface Card (NIC) throughput, and a latency to at least one replacement storage node.

21. A disaggregated distributed storage system (DDSS) comprising:

a plurality of storage nodes;

a plurality of memory controllers, wherein each memory controller of the plurality of memory controllers is associated with each storage node of the plurality of storage nodes; and a replication recovery device configured to:

identify an affected storage node from among the plurality of storage nodes based on one or more predetermined conditions, select a replacement storage node from among the plurality of storage nodes based on one or more replacement storage parameters corresponding to the each storage node, select at least one memory controller to perform a replication recovery operation from among the plurality of memory controllers based on at least one of a time required by the at least one controller to perform the replication recovery operation, and a bandwidth degradation associated with using the at least one controller to perform the replication recovery operation, wherein the replication recovery operation is used to recover replication data stored in the affected storage node from the replacement storage node; and assign one or more replication recovery jobs to the at least one controller, wherein the one or more replication recovery jobs are included in the replication recovery operation, and receive a notification from the at least one controller based on the one or more replication recovery jobs being completed.

* * * * *